United States Patent [19]

DeLuca

[11] Patent Number: 5,039,037
[45] Date of Patent: Aug. 13, 1991

[54] THROTTLE CONTROL SYSTEM HAVING MANUAL AND AUTOMATIC MODES OF OPERATION

[75] Inventor: Brian L. DeLuca, Seattle, Wash.
[73] Assignee: The Boeing Company, Seattle, Wash.
[21] Appl. No.: 405,810
[22] Filed: Sep. 11, 1989
[51] Int. Cl.$^5$ .................... B64C 13/18; G05D 1/00
[52] U.S. Cl. .................... 244/234; 244/175; 244/192; 244/194
[58] Field of Search ............ 244/234, 175, 182, 188, 244/194, 195, 196, 197, 192, 220, 221, 75 R, 76 R, 228; 60/243, 39.281; 74/491; 318/563, 565; 200/61.85, 61.89, 61.9, DIG. 32; 364/431.01, 434, 424.03; 371/8.1, 31

[56] References Cited

U.S. PATENT DOCUMENTS

| | | |
|---|---|---|
| 2,429,642 | 10/1947 | Newton . |
| 2,734,155 | 2/1956 | Schuck . |
| 2,925,967 | 2/1960 | Jofeh . |
| 2,950,075 | 8/1960 | Owen . |
| 2,982,498 | 5/1961 | Gallagher et al. . |
| 3,362,661 | 1/1968 | Booth et al. . |
| 3,425,649 | 2/1969 | Colwell et al. . |
| 3,522,729 | 8/1970 | Miller . |
| 3,622,105 | 11/1971 | Buchholz et al. . |
| 3,691,356 | 9/1972 | Miller . |
| 3,813,063 | 5/1974 | Martin . |
| 3,908,934 | 9/1975 | Schloeman . |
| 3,981,442 | 9/1976 | Smith . |
| 3,989,208 | 11/1976 | Lambregts . |
| 4,205,814 | 6/1980 | Larson et al. ............ 244/182 |
| 4,259,838 | 4/1981 | McCollum, Jr. et al. ...... 244/196 X |
| 4,325,123 | 4/1982 | Graham et al. ............ 244/182 X |
| 4,569,021 | 2/1986 | Larson et al. ............ 244/182 X |
| 4,589,616 | 5/1986 | Zweifel ............ 244/182 X |

OTHER PUBLICATIONS

"Engine Control", Jan. 1986, Airbus A-320 Brochure.

Primary Examiner—Joseph F. Peters, Jr.
Assistant Examiner—James M. Kannofsky
Attorney, Agent, or Firm—Robert H. Sproule; Bernard A. Donahue

[57] ABSTRACT

A throttle controller includes a manual mode where engine output is a function of throttle lever angle, and an alternatively selectable Speed Hold/Thrust Hold mode which is initiated when the throttle is placed in a center Hold position. Throttle operation during the Speed Hold mode is governed by (i) a selected speed entered at a mode control panel, or (ii) a speed existing when the lever was placed in the Hold detent, given that no speed is entered and selected at that mode control panel or (iii) a selected speed/thrust designated in a flight plan entered into the aircraft's flight management computer. During the Thrust Hold mode, the throttle controller maintains the level of thrust which existed when the throttle lever was placed in the Hold detent. When out of the Hold detent, the controller operates to control output thrust as a function of Throttle Lever Angle (TLA). Failure of the Speed Hold mode or Flight Plan mode, causes autothrottle operation to default through a priority scheme, which generally results in a mode where the airspeed existing at the time of failure is maintained. In order to allow the pilot to make very small changes in engine thrust without increasing the total range of throttle movement, every time the throttle is placed in the center Hold position a new thrust versus throttle lever angle function is calculated to afford increased throttle movement sensitivity.

18 Claims, 6 Drawing Sheets

THROTTLE CONTROL SYSTEM HAVING MANUAL AND AUTOMATIC MODES OF OPERATION

TECHNICAL FIELD

The present invention pertains to a throttle control system for an aircraft, and more particularly to a digitally interfaced fly-by-wire or fly-by-light throttle control system which has a first operational mode for providing manual control of engine output and a second operational mode for providing automatic control of engine output.

BACKGROUND OF THE INVENTION

Most conventional aircraft engine throttle control systems regulate engine output by means of a throttle lever which is manually positioned by the pilot. The commanded position of the throttle lever is mechanically transmitted to the aircraft engine via a number of cams, gears, pulleys and cables in order to regulate engine output. Some aircraft have autothrottle control systems which adjust the engine output to maintain, for example, a selected airspeed. During autothrottle operation, the throttle lever is repositioned by the autothrottle controller instead of the pilot, so that (i) the position of the throttle lever (i.e., throttle lever angle) is mechanically transmitted to the engine and (ii) the throttle lever angle is consistent with the current output of the engine. During such autothrottle operation, the throttle lever angle provides feedback to the pilot as to the output of the engine. Autothrottle operation is often initiated from a separate control panel in the cockpit.

Disadvantages of these conventional throttle control systems include both their mechanical complexity and their high weight, both of which adversely affect initial manufacture, installation and subsequent maintenance. Furthermore, autothrottle operation and mode selection are often initiated from a separate control panel in the cockpit which detracts somewhat from their convenience.

It is therefore desirable to provide a throttle control system which overcomes the disadvantages of conventional throttle control systems.

SUMMARY OF THE INVENTION

The present invention pertains to a throttle controller for an aircraft engine. The throttle controller operates initially to determine whether the throttle lever is commanding a manual operating mode or an automatic operating mode. If the throttle lever is commanding an automatic mode, then engine thrust is determined as a function of a speed selected by the pilot or as a function of a speed or thrust set forth in a flight plan located in the aircraft's flight management computer. In the event the pilot-selected speed or the selected speed/thrust from the flight management computer is not available or is faulty, then engine thrust is automatically controlled to maintain the aircraft airspeed or engine thrust existing at the time the fault condition was detected. Other details of the invention will be explained hereinafter.

BRIEF DESCRIPTION OF THE DRAWINGS

The present invention will be described in greater detail by referring to the following detailed description in conjunction with the attached drawings, in which:

FIG. 7 is an exemplary graph of engine thrust vs. TLA during idle and takeoff for the throttle system of the present invention;

DETAILED DESCRIPTION

Figure 1:
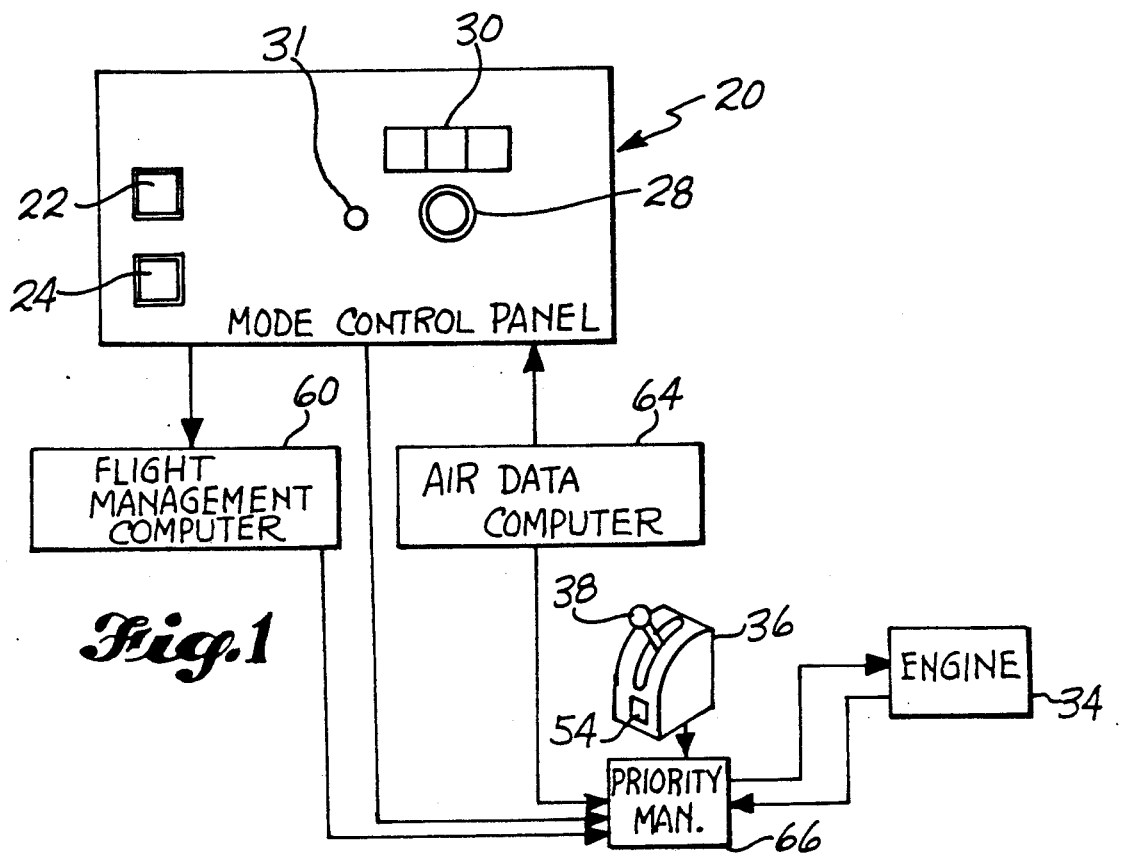
FIG. 1 is a simplified block diagram of the throttle control system of the present invention.

Reference is made to FIG. 1 where there is shown an exemplary embodiment of the throttle control system of the present invention. The system includes a mode control panel (MCP) indicated at 20 including a Speed Hold/Thrust Hold mode select button 22 and a Flight Plan engage button 24. The MCP 20 also includes a knob 28 for manually dialing a desired airspeed or mach number at a window 30, as well as a Mach/airspeed function selection button 31. In order to select additional operating modes or to manually control the output of an aircraft engine 34 there is provided a throttle stand indicated at 36 having a lever 38.

Figure 2:
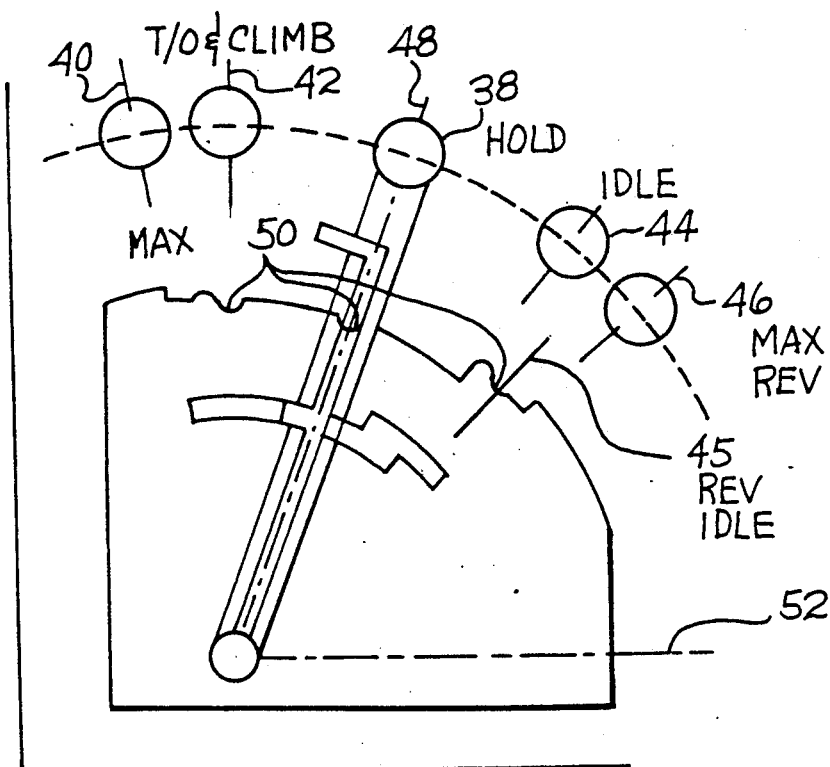
FIG. 2 is a side view of a throttle lever which forms a portion of the throttle control system.

As shown more clearly in FIG. 2, the throttle control system includes the movable lever 38 which operates between a number of conventional positions such as a maximum thrust position identified by a number 40, a takeoff and climb position 42, an idle position 44, a reverse thrust at idle power position 45, and a maximum reverse thrust position 46. The throttle lever includes a Hold position 48, which is approximately midway between the idle position 44 and the takeoff & climb position 42. In the present invention, positions 40, 42, 45 and 48 are also mode selectors. For example, when the throttle is moved to position 40 a preprogrammed maximum thrust value is used to control engine output. Similarly, when the throttle is moved to positions 42, 45 or 48 preprogrammed values for takeoff and climb, idle or reverse thrust at idle. In addition, position 42 selects takeoff or climb thrust levels which may be full-rated or derated levels which are obtained from other avionics systems on board the aircraft in a conventional manner. At each position 50 there is a detent which holds the throttle lever until moved by the pilot. In the present application, an angle formed in a counterclockwise direction between an imaginary horizontal line identified by a number 52 (FIG. 2) and the longitudinal axis of the throttle lever, identified by the number 53, is referred to as the throttle lever angle (TLA).

In the present invention, when the throttle lever is not in the Hold position 48 engine operation is defaulted to a Thrust vs. TLA mode, and thrust is a direct function of the throttle lever angle. The controller includes another Speed Hold/Thrust Hold select button 54

(FIG. 1) which may be conveniently located on the throttle stand 36. This button 54 is functionally identical to the Speed Hold/Thrust Hold select button 22 located on the MCP. Whichever of these buttons 22 or 54 is activated last has priority.

When the Speed Hold mode is selected by the buttons 54 or 22, and the throttle lever is in position 48 (Hold), aircraft thrust is automatically controlled to maintain selected airspeed or Mach in the following sequential order: (i) Flight Plan speed or Mach if available from the aircraft flight management computer and engaged via MCP button 24, (ii) speed or Mach set in MCP window 30 if engaged via button 22, and (iii) if neither (i) nor (ii) are available due to a loss of signal, the current aircraft airspeed or Mach existing at the instant of loss of (i) or (ii). More specifically, when the failure occurs, the aircraft airspeed at the time of failure is retrieved from a conventional air data computer 64 (FIG. 1). Using a conventional error loop, the engine output is adjusted to hold this airspeed until the throttle is moved from the Hold detent or until the failure is corrected.

When the throttle is advanced or retarded through a selected angle (out of Hold), the aircraft airspeed is increased or decreased due to a thrust change which is proportional to the change in TLA. To aid the pilot in identifying the speed and thrust changes corresponding to the change in TLA, the commanded speed and thrust may be displayed by "bugs" or pointers (not shown) on the pilot's airspeed indicator and thrust indicator, respectively. In this manner, the pilot can adjust the TLA to achieve the desired airspeed change.

Although it is not a part of the present invention, many modern commercial aircraft such as the Boeing 757/767 include a flight management computer (FMC) identified by a number 60 in FIG. 1. The FMC software contains the necessary navigational waypoints, airspeeds, thrust settings, and altitudes to control the flight of the aircraft from takeoff through landing approach. When the Flight Plan button 24 is engaged in order to control the aircraft flight, one of the data outputs from the FMC 60 is either a commanded airspeed, commanded Mach or a commanded thrust (depending upon whether the FMC Program has required a commanded thrust or airspeed/Mach to control engine output during that leg of the flight).

In order to accomplish these tasks, the present invention includes a unique priority manager indicated by a control block 66 (FIG. 1). The priority manager is a microprocessor-based controller which operates in accordance with the flow chart set forth in FIG. 3. More specifically, the priority manager 66 determines whether there is a signal output from the throttle lever (decision block 70). If no signal is detected, then a failure alert is displayed on a flight deck display panel (not shown). However, if a signal is detected, then a determination is made whether the throttle lever is in the Hold position (decision block 72). If the throttle is not in the Hold position, then aircraft thrust is regulated as a function of TLA (flowblock 73). If the throttle lever is in the Hold position, then the position of the Speed/Thrust buttons 54 or 22 is determined (decision block 74). In the event the Thrust Hold control mode has been selected, then engine output is adjusted to hold the engine thrust that was being generated when the throttle lever was placed in Hold (flowblock 75).

On the other hand, if the throttle lever is in the Hold position, and the position of button 54 or 22 is changed from Speed Hold to Thrust Hold, then thrust is maintained at the level present when such switch selection was made. Automatic speed hold control is accomplished by the priority manager 66 in a conventional manner by comparing the airspeed, Mach or flight plan requirement with the current aircraft airspeed (obtained from the air data computer 64). This generates an error signal which is driven to zero by means of a conventional error loop. In the event manual thrust control is selected, then engine output is adjusted to set thrust as a function of the TLA in a similar conventional manner.

In the event that either i) the Speed Hold mode is selected when the throttle lever is in the Hold position (at decision block 74), or ii) there is no signal output from the throttle lever (at decision block 70), then a determination is made (decision block 76) whether the Flight Plan mode has been selected at the mode control panel. If the Flight Plan button 24 on the MCP has been selected, then a determination is made (decision block 78) whether the FMC flight plan data is valid. This determination is made by a separate system which is not part of the present invention.

Once it is determined that the flight plan is valid, then a conventional built-in self check of the FMC is performed to ensure the FMC is operating properly (decision block 80). If the self check is satisfactory, then the programmed airspeed, Mach or thrust command corresponding to the current flight leg of the aircraft is obtained from the FMC (flowblock 81). This airspeed or thrust command is compared to the current airspeed, Mach or engine thrust to generate an error signal. This error signal is fed to a controller (not shown) on the engine which controls the operation of the engine in a conventional manner (flowblock 82 in FIG. 4). Further descriptions of navigational operating modes in the FMC are provided in U.S. Pat. No. 4,692,869 entitled "Aircraft Navigational Systems and Methods for Creating Navigational Guidepoints", as well as U.S. Pat. No. 4,792,906 entitled "Navigational Apparatus and Methods for Displaying Aircraft Position With Respect To A Vertical Flight Path Profile"; both of which are assigned to the assignee of the present invention.

Figure 3:
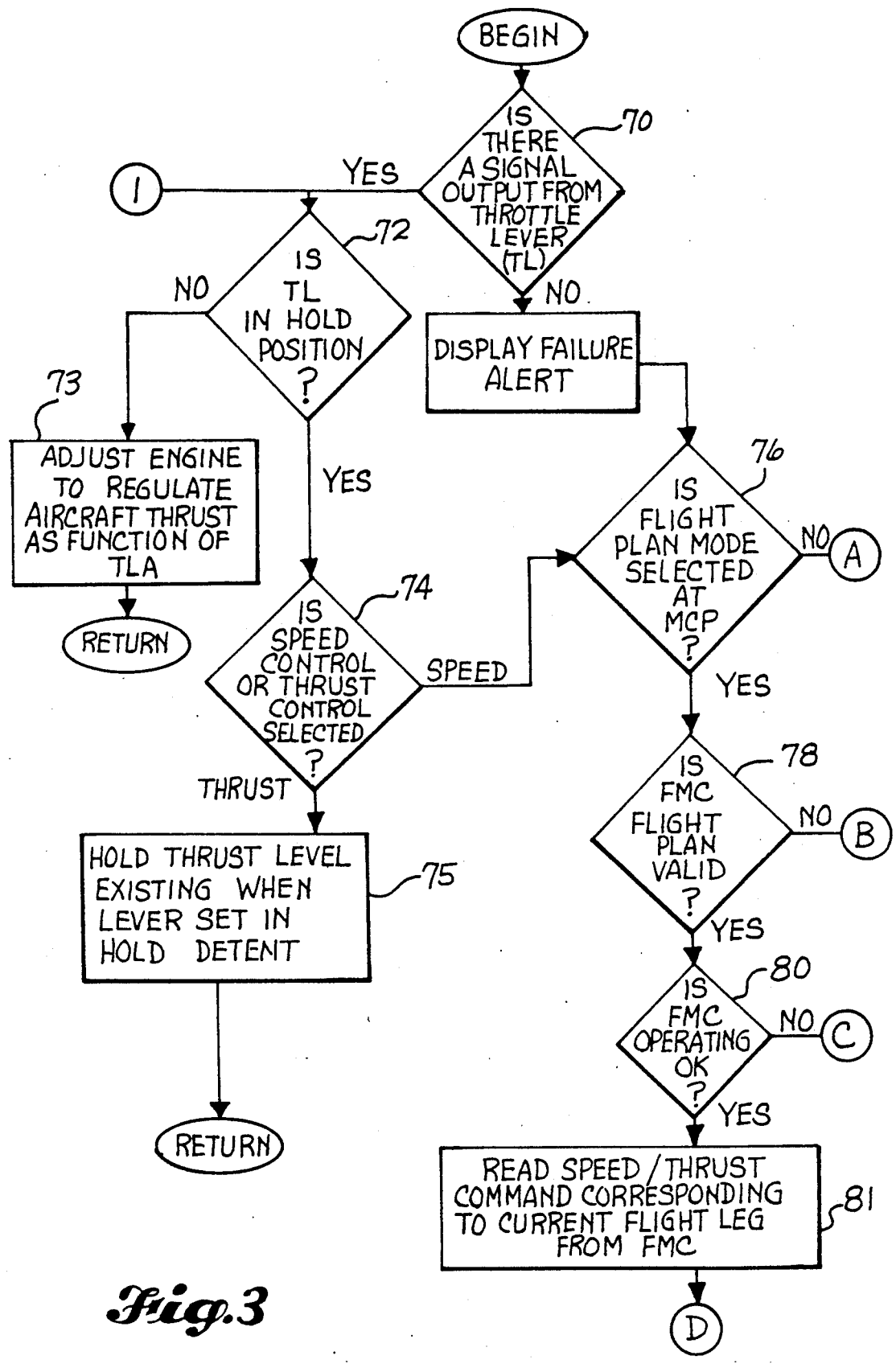
FIGS. 3 and 4 are flowcharts describing operation of the throttle control system.
Figure 4:
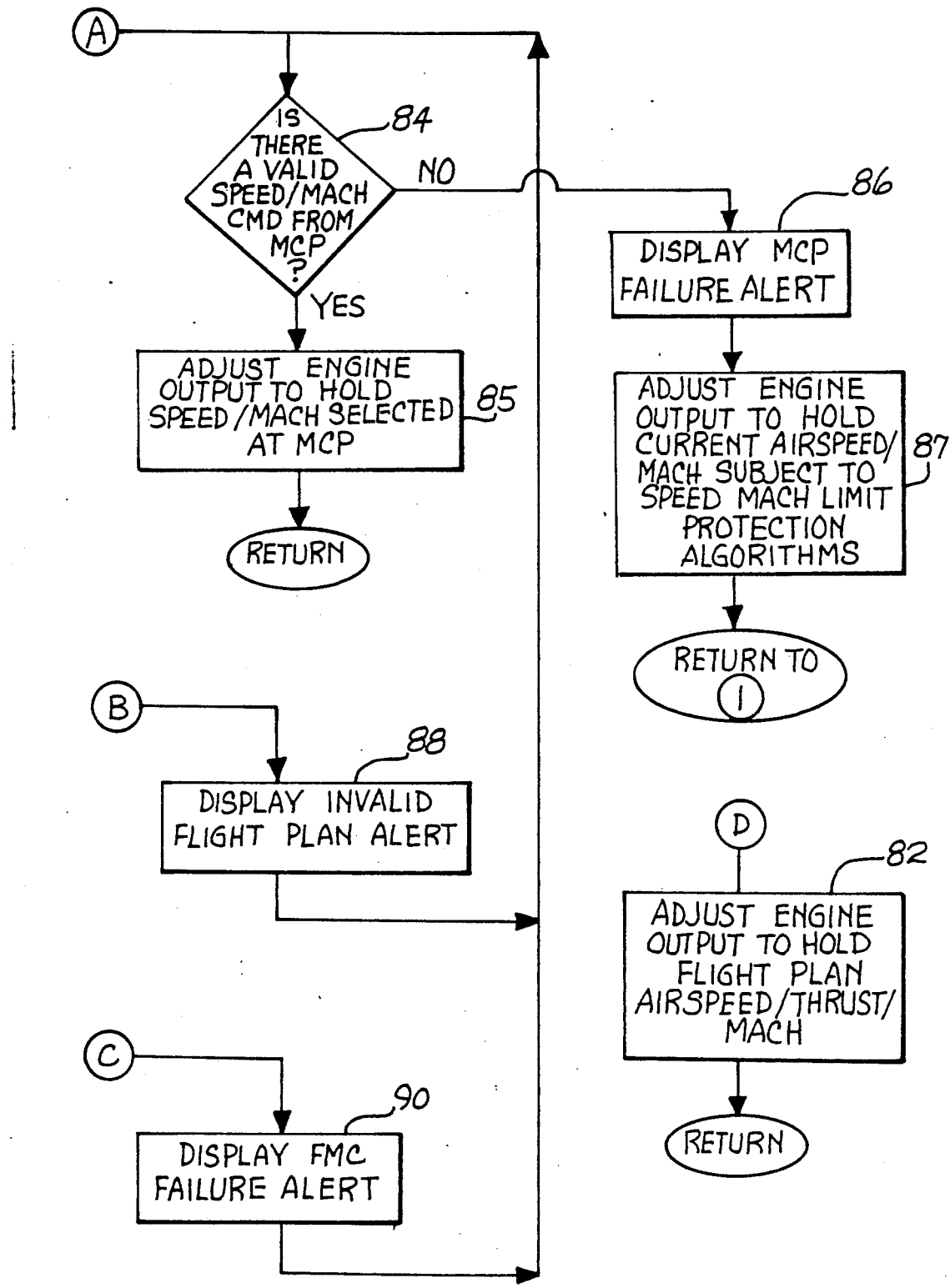

In the event the Flight Plan mode has not been selected at the mode control panel (decision block 76 in FIG. 3), a determination is made whether the mode control panel is generating a valid speed/Mach command (decision block 84 in FIG. 4). This is accomplished by comparing the generated speed/Mach command with established parameters in a conventional manner. If the speed command is determined to be valid, then the engine output is adjusted to hold the speed/Mach selected at MCP window 30 (flowblock 85).

On the other hand, if the speed command from the MCP is not valid (decision block 84), an MCP failure alert is displayed (flowblock 86) and the engine output is adjusted to hold the current airspeed of the aircraft subject to conventional overriding speed/Mach limit protection algorithms (flowblock 87).

In the event the FMC flight plan is not valid (decision block 78 in FIG. 3) or the FMC is not operating properly (decision block 80), a failure alert is displayed (flowblocks 88, 90 in FIG. 4) to alert the pilot. Operation then flows to the decision block 84 where a determination is made whether a valid speed/Mach command is coming from the MCP.

As shown in the flowchart illustrated in FIGS. 3 and 4, the priority manager controls autothrottle operation by interrogating the throttle lever and the mode control panel. In the event of an unsatisfactory response from either of them, the priority manager ensures the current airspeed of the aircraft is maintained (subject to preprogrammed limit protections) until the pilot can respond to the failure alert and take corrective action.

Figure 5:
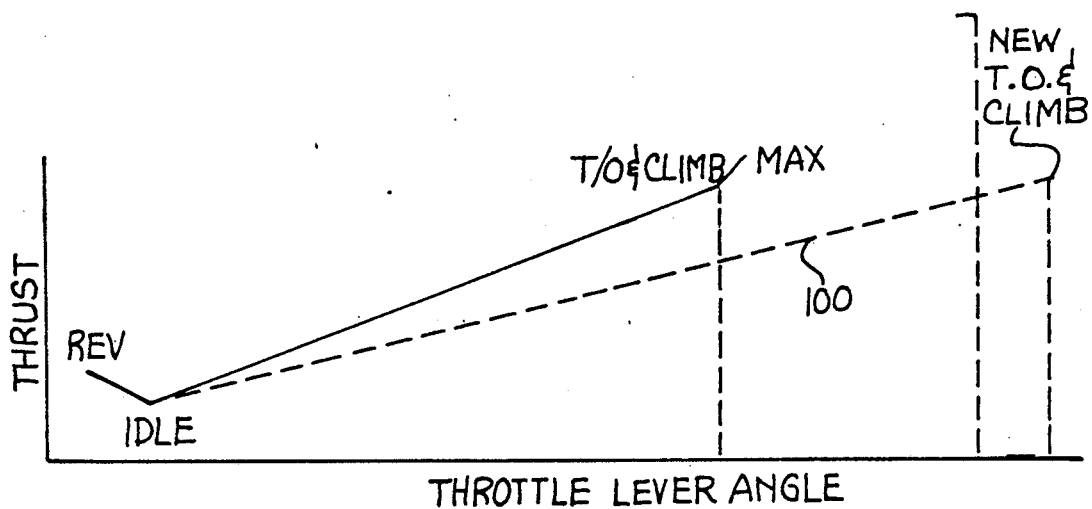
FIG. 5 is an exemplary graph of engine thrust as a function of throttle lever angle (TLA) for a conventional throttle system.

Having described the overall operation of the controller, a description of its other features now will be provided. Some modern jet aircraft may have aerodynamic surfaces which are so free of drag (clean) that changes in TLA and resultant thrust, which are small by conventional standards, can cause large changes in aircraft airspeed. More precisely, many conventional throttles are unable to made small enough changes in position to avoid making large changes in aircraft speed. An obvious solution to this problem is to increase the range or distance (TLA) that the throttle moves when travelling between idle and takeoff thrust. In this manner, the ratio of the change in engine thrust to the change in TLA is decreased (i.e., decreased slope of Thrust v TLA line 100 shown in FIG. 5). This allows a smaller incremental change to be made in engine thrust. A disadvantage of this approach is that it significantly increases the total travel (i.e., TLA and linear displacement of the throttle lever knob) of the throttle, as shown more clearly in FIG. 5. This increased range of throttle movement may be beyond the limits of convenient manipulation by the pilot.

Figure 6:
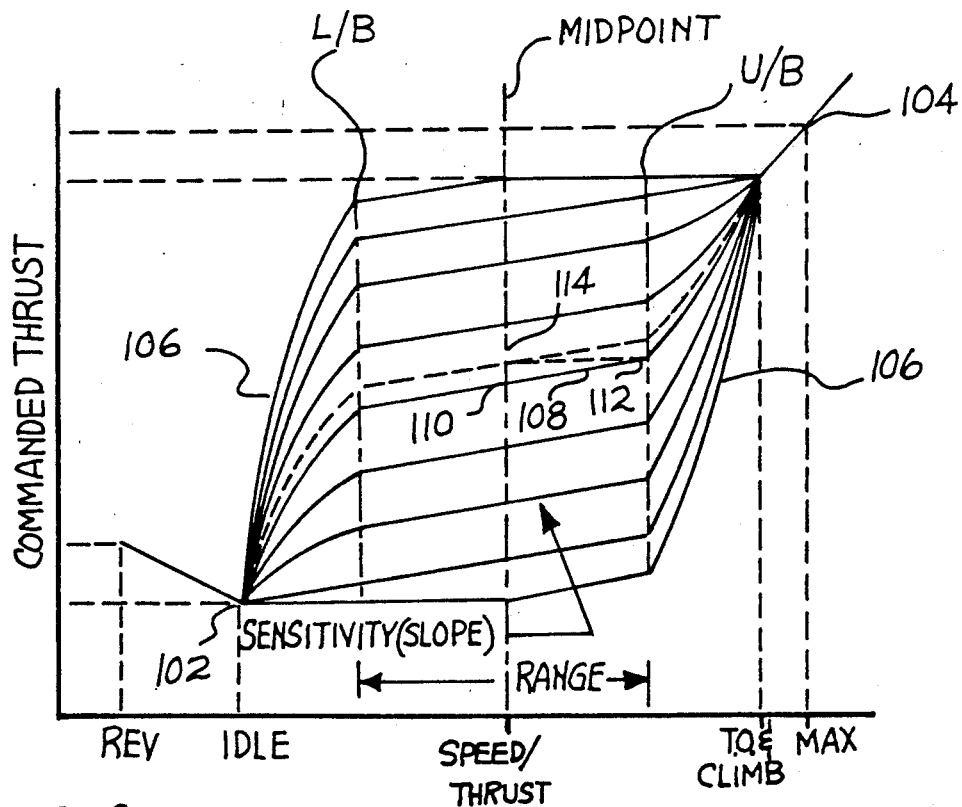
FIG. 6 is an exemplary graph of engine thrust as a function of TLA for the throttle system of the present invention.
Figure 1:
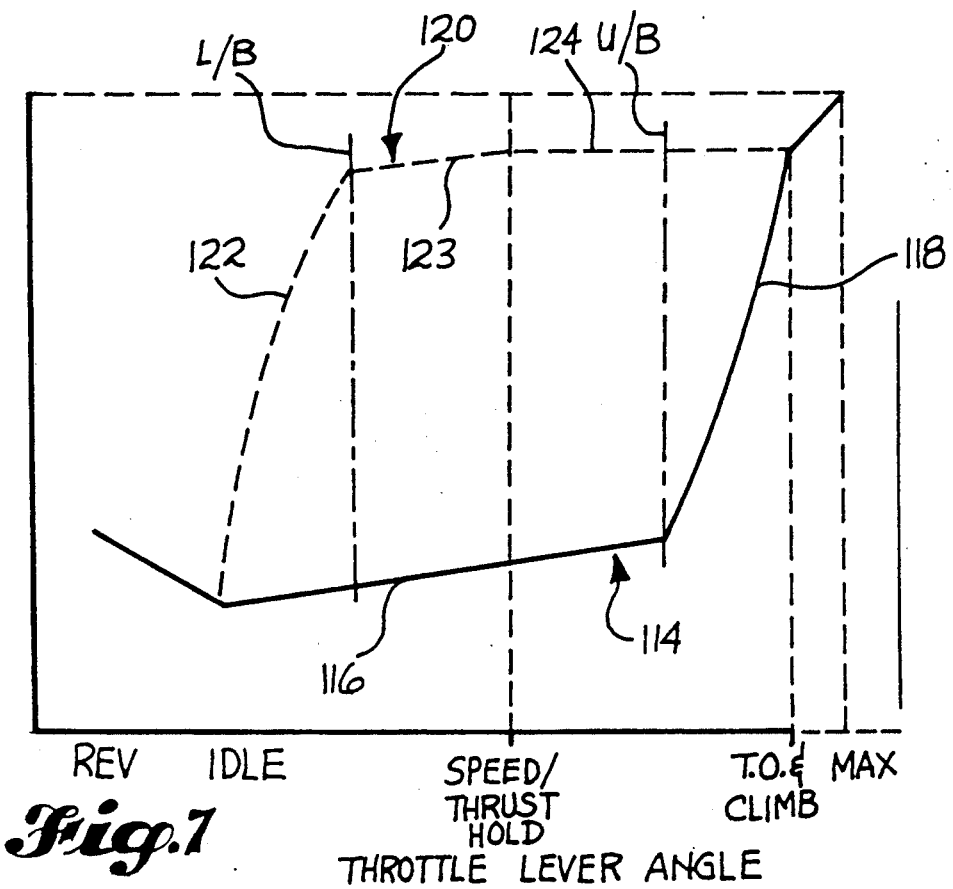

In an exemplary embodiment shown in FIG. 6, there is provided a real time computed "folded" scale which provides a constant sensitivity about the Hold position of the throttle lever. That is, each time the throttle is placed in the Hold detent, the commanded thrust as a function of TLA is recomputed so that i) the center or midpoint of the thrust vs. TLA function is at the Hold detent, and ii) there is a constant positive slope between an upper range boundary U/B and a lower range boundary L/B. At the range boundaries, the constant positive slope line is faired into an idle point 102 and a take-off-and-climb point 104. At the faired ends 106, there is much less sensitivity (steep slope) and therefore small changes in throttle lever angle generate large changes in thrust. An assumption is made at the faired ends that sensitivity is not necessary, and that, most likely, large changes in thrust are desired by the pilot at these throttle lever angles. Although a representative family of lines is shown in FIG. 6, only one complete line exists at any instant. In this manner, there always exists a full forward range and a full rearward range about the Hold (center detent) position.

In operation, moving the throttle lever out of the Hold detent begins thrust vs. TLA operation along line 108 from point 110 to point 112. This results in an increase in commanded thrust. Returning the throttle lever to the Hold detent (when operating in the Speed Hold mode), causes the controller to hold the current airspeed of the aircraft existing at the time the throttle lever is returned to the Hold detent. A new thrust vs. TLA curve (straight line with faired end curves) is computed around the Hold detent at the new thrust level as shown at Point 114 in FIG. 6.

Computation of the thrust vs. TLA curves is accomplished by an algorithm in the priority manager. The algorithm is developed as function of such parameters as engine responsiveness, change in airspeed as a function of change in engine thrust, desired TLA range of motion considering ability to control small incremental TLA inputs, and established thrust limits for reverse, idle, climb and maximum which are unique to the engine in question.

More specifically, using the cartesian coordinate general equation for a straight line ($y = mx + b$), the straight line connecting the upper range boundary (U/B in FIG. 6) and the lower range boundary (L/B) may be computed in real time immediately following the placement of the throttle lever in the Hold detent. In this equation, b = current engine thrust (when in Thrust Hold mode) or engine thrust required to hold current speed (when in Speed Hold mode). Furthermore, x = throttle lever angle when the throttle is in the Hold detent position. The variable m, which equals the selected slope (sensitivity), and which is a selected incremental change in commanded thrust per incremental change in TLA, is determined analytically based upon actual engine operation. Thus, y = thrust at TLA (x). In other words, when the throttle lever is moved out of the Hold detent, y is calculated using the sensed x (TLA) and the most recent current engine thrust or thrust required to hold the most recent aircraft airspeed. The TLA range is also determined experimentally based upon optimum use by the pilot. The idle point 102 and take-off-and-climb point 104 are established by the engine manufacturer.

The faired end curves which connect the lower boundaries (L/B) to the idle point 102, and which connect the upper boundaries (U/B) to the take-off-and-climb point 104 of the thrust vs. TLA curve, are calculated experimentally. However, all end curves 106 have the following properties: 1) their slopes are always positive, 2) the end curves do not have any discontinuities, 3) the end curves are smoothly faired to the straight line segment (i.e., the derivative of the equation defining the straight line equals the derivative of the equation defining the end curve at the point of transition between the two equations), 4) there are no undefined outputs or infinite outputs, 5) there are no stepped outputs.

Since it is known that increased thrust is necessary to maintain airspeed during aircraft turns, b (engine thrust to maintain current airspeed) is recalculated in a conventional manner as a function of aircraft bank angle. Therefore, in the event the throttle is manually moved out of the Hold detent during a turn, immediate engine response is available.

As a further example of a thrust vs. TLA curve for a taxi and takeoff sequence, reference is made to FIG. 7. Prior to initial taxi, curve 114 is generated in a manner to include a lower taxi segment 116 and an upper climb segment 118. Once airborne after takeoff, there is calculated a new curve 120 which is formed by a line segment 122, a line segment 123 at sensitivity slope m, and a level-off segment represented by a fairing line 124. It should be noted that since climb is a Thrust mode selection, the controller is not holding speed.

Figure 8:
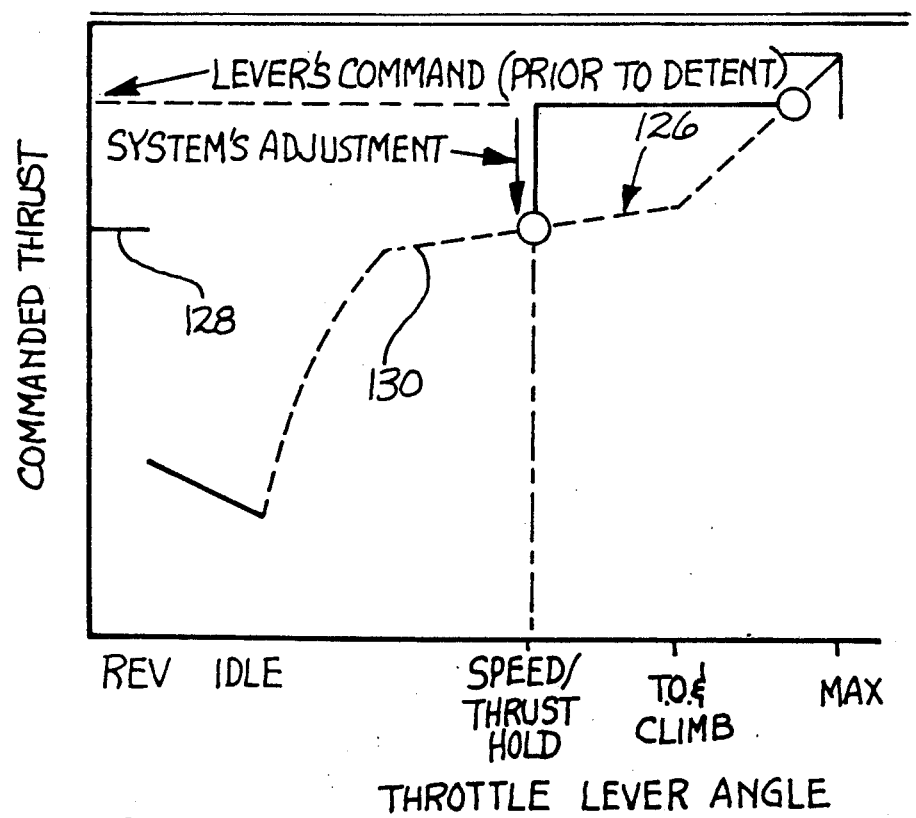
FIG. 8 is an exemplary graph of engine thrust vs. TLA during climbout and level-off for the throttle system of the present invention.

In the event it is desired to control the climbout by using the Speed Hold mode, the Speed/Thrust button (54 or 22) is placed in the Speed position and the throttle lever 38 is placed in the Hold detent. This causes the thrust to be modulated so as to maintain the speed which existed at the instant that throttle lever 38 was placed in Hold position. During manual level-off, this speed is held by continuous modulation of engine thrust. Once the aircraft is level, a new thrust vs. TLA curve (line 126 in FIG. 8) is calculated about the thrust required to hold that speed in level flight (indicated by the number 128 in FIG. 8). This curve is generated about the Hold detent position at the new thrust level in the manner discussed previously.

Figure 9:
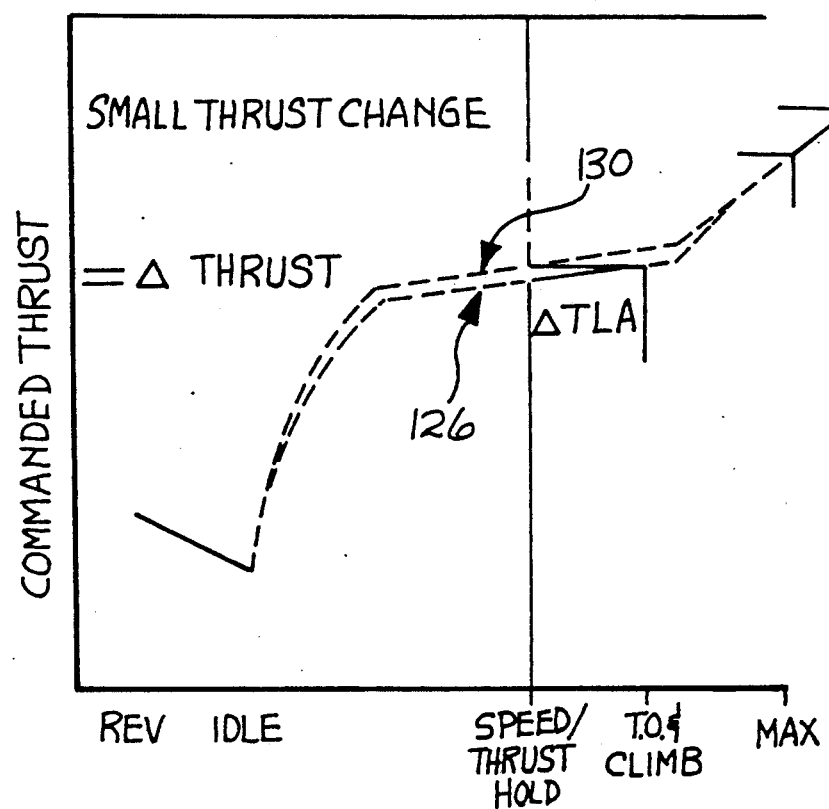
FIG. 9 is an exemplary graph of engine thrust vs TLA curve (126) for the throttle system of the present invention in which there is illustrated a second thrust vs. TLA curve (130) required to maintain a small airspeed increase during level flight.

If a speed adjustment is necessary after leveling off, the thrust vs. TLA curve 126 (FIG. 8) allows for a thrust command having a sensitivity which allows for small throttle changes to achieve small speed changes. When the new speed is reached, and the throttle is returned to the Hold position, a new Thrust vs. TLA curve (line 130 in FIG. 9) is calculated.

If a Flight Plan mode from the MCP is desired, the Speed Hold mode is selected using buttons 54 or 22. In addition, the Flight Plan 24 is engaged, and the throttle lever 38 is placed in Hold. The Priority Manager then will follow the speed/thrust requirements of the flight plan stored in the flight management computer system. Any movement of the throttle lever 38 out of the Hold detent by the pilot allows for operation along the entire thrust vs. TLA curve currently calculated. All calculated curves include idle, takeoff and climb, and maximum thrust availability.

What is claimed is:

1. A throttle control system for an aircraft engine, the throttle control system comprising:
   a. throttle means including means for generating a first signal for controlling operation of the engine;
   b. means for detecting a failure of the first signal;
   c. means for determining a level of an aircraft operating parameter existing when the failure of the first signal is detected; and
   d. means, responsive to the first signal failure, for generating a second signal for operating the engine as a function of the existing level of the aircraft operating parameter.

2. The throttle system as set forth in claim 1 wherein the throttle means includes means for selecting between (i) a first manual mode of operation and (ii) a second automatic mode of operation.

3. The throttle control system as set forth in claim 2 wherein:
   a. the throttle control system additionally includes means for storing an aircraft operating parameter; and
   b. the throttle means includes means for generating the first signal, when the throttle means is in the automatic mode, as a function of the stored aircraft operating parameter.

4. The control system as set forth in claim 3 wherein the storing means includes means for storing an aircraft operating parameter which is an aircraft airspeed.

5. The control system as set forth in claim 2 wherein the throttle means includes:
   a. means for selecting between an engine thrust mode and an aircraft airspeed mode when in the automatic mode of operation; and
   b. means, when the throttle means is in the automatic mode, for generating the first signal for controlling engine operation as a function of an engine thrust when the engine thrust mode has been selected and as a function of aircraft airspeed when the aircraft airspeed mode has been selected.

6. The control system as set forth in claim 2 wherein:
   a. the storing means includes (i) means for storing an aircraft flight plan operating parameter and (ii) means for storing an operating parameter selected by a pilot of the aircraft; and
   b. the throttle means includes means, when the throttle means is in the automatic mode, for generating the first signal for operating the engine as a function of the aircraft flight plan operating parameter, and upon the failure of the aircraft flight plan operating parameter, then for operating the engine as a function of the operating parameter selected by the pilot, and upon the failure of the operating parameter selected by the pilot, then for operating the engine as a function of the existing level of the aircraft operating parameter.

7. The control system as set forth in claim 6 wherein the second signal generating means includes means, responsive to the failure of the first signal, for generating the second signal to operate the engine as a function of the aircraft flight plan operating parameter, and upon the failure of the aircraft flight plan operating parameter, then for operating the engine as a function of the operating parameter selected by the pilot, and upon the failure of the operating parameter selected by the pilot, then for operating the engine as a function of the existing level of the aircraft operating parameter.

8. The control system as set forth in claim 2 wherein the throttle means includes a throttle level which is movable between a plurality of positions for generating a plurality of first signals for controlling the operation of the engine as a function of the throttle lever position when the throttle means is in the manual mode of operation.

9. The control system as set forth in claim 8 wherein the throttle means includes means for controlling the engine as a function of an angle of the throttle lever when the throttle means is in the manual position.

10. The control system as set forth in claim 2 wherein the throttle means including means for generating the first signal as a function of the level of engine thrust existing when the throttle is placed in the automatic position when the thrust mode of operation has been selected.

11. A method for controlling an aircraft engine comprising the steps of:
   a. operating a throttle so as to generate a first signal for controlling operation of the engine;
   b. detecting a failure of the first signal;
   c. determining a level of an aircraft operating parameter existing when the failure of the first signal is detected; and
   d. generating a second signal for operating the engine as a function of the existing level of the aircraft operating parameter.

12. The method as set forth in claim 11 wherein the aircraft operating parameter is an aircraft airspeed.

13. The method as set forth in claim 11 wherein the operating step includes selecting i) a first manual mode of throttle operation and ii) a second automatic mode of throttle operation.

14. The method as set forth in claim 13 additionally comprising the steps of:
   a. storing an aircraft operating parameter; and
   b. generating the first signal as a function of the stored aircraft operating parameter when the throttle is in the automatic mode.

15. The method as set forth in claim 14 wherein the storing step includes storing an aircraft operating parameter which is an aircraft airspeed.

16. The method as set forth in claim 15 wherein the throttle operating step includes:
   a. selecting between an engine thrust mode and aircraft speed mode when in the automatic mode of operation; and
   b. generating, when the automatic mode has been selected, the first signal for controlling engine operation as a function of an engine thrust when the engine thrust mode has been selected and as a function of aircraft airspeed when the aircraft airspeed mode has been selected.

17. The method as set forth in claim 16 wherein the throttle operating step includes the step of generating, when the automatic mode has been selected, the first signal for operating the engine as a function of an operating parameter stored in an aircraft flight plan, and upon the failure of the operating parameter stored in the aircraft flight plan, then for operating the engine as a function of an operating parameter selected by a pilot of the aircraft, and upon the failure of the operating parameter selected by the pilot, then for operating the engine as a function of the existing level of the aircraft operating parameter.

18. The method as set forth in claim 17 wherein the throttle operating step includes the step of generating the first signal as a function of the level of engine thrust existing when the throttle is placed in the automatic position when the thrust mode of operation has been selected.

* * * * *